United States Patent [19]

Tsuchiya

[11] 4,352,127
[45] Sep. 28, 1982

[54] METHOD AND APPARATUS FOR ANALYZING STREAK IMAGE OF LIGHT PULSE FORMED ON ELECTRO-OPTICAL STREAKING IMAGE TUBE

[75] Inventor: Yutaka Tsuchiya, Hamamatsu, Japan

[73] Assignee: Hamamatsu TV Co., Ltd., Hamamatsu, Japan

[21] Appl. No.: 107,181

[22] Filed: Dec. 26, 1979

[30] Foreign Application Priority Data

Dec. 27, 1978 [JP] Japan .................. 53-163329

[51] Int. Cl.$^3$ ............................................. H04N 5/34
[52] U.S. Cl. .......................... 358/217; 250/213 VT; 358/107
[58] Field of Search .................. 358/107, 209, 217; 250/213 VT

[56] References Cited

U.S. PATENT DOCUMENTS 3,761,614 9/1973 Bradley.

Primary Examiner—Robert L. Richardson
Attorney, Agent, or Firm—Wenderoth, Lind & Ponack

[57] ABSTRACT

Using a conventional camera tube, a streak image of light pulse formed on a streaking image tube is converted into an electronic signal, progressively scanned, without interlaced scanning, using scanning lines n-times as many as in standard scanning, and stored in a picture memory unit. The memorized picture is read out as video signals by a 2n:1 interlaced scanning. The video signals are sent to an integrating unit for integration by scanning line. Each integrated value is stored at an address corresponding to the order of the scanning line in a second memory. When the integrated values for all scanning lines have been memorized, they are read out in the order of address to produce a waveform corresponding to the streak image. Also, on completion of the storing in the second memory, the video signals read out from the picture memory unit by the 2n:1 interlaced scanning and signals obtained by converting the integrated values read out from the second memory by the 2n:1 interlaced scanning into time modulation pulses are superimposed on the screen of the television monitor to clarify the relation between the streak image and a waveform showing its intensity distribution.

6 Claims, 6 Drawing Figures

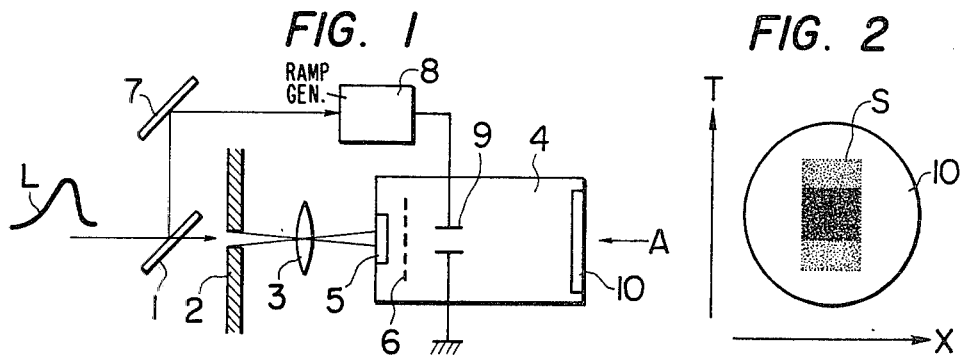
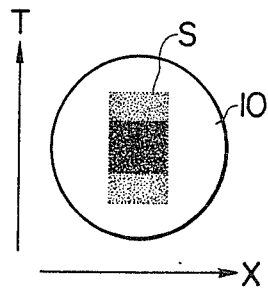
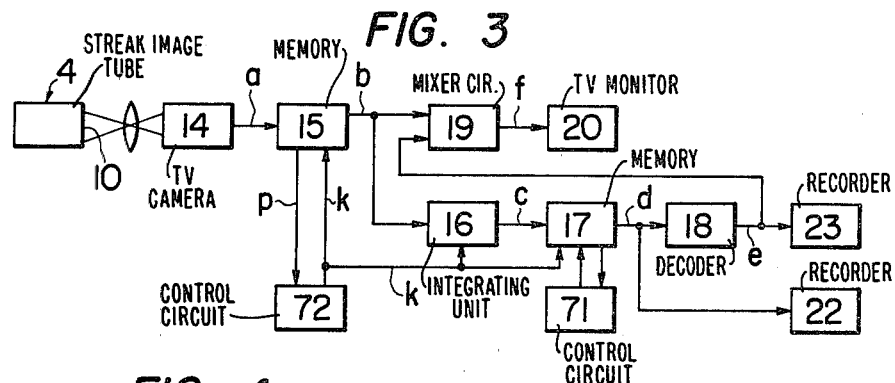
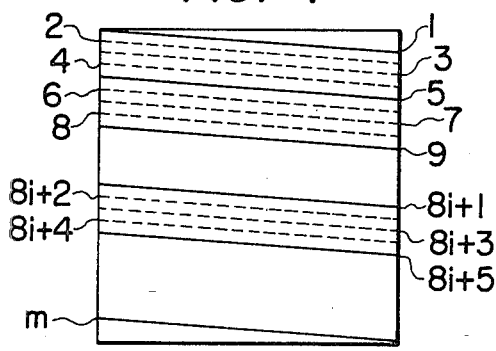
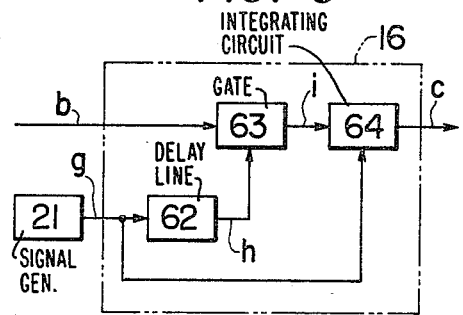
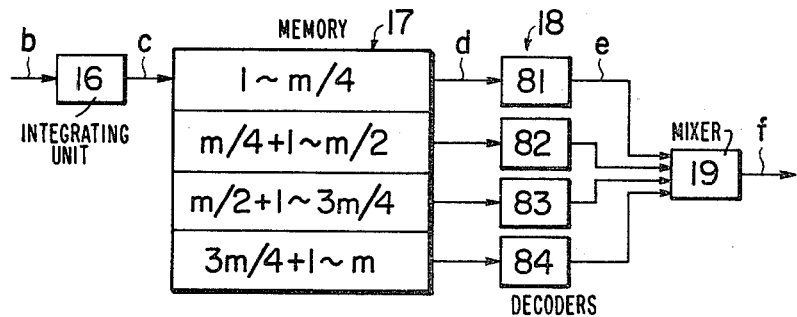

METHOD AND APPARATUS FOR ANALYZING STREAK IMAGE OF LIGHT PULSE FORMED ON ELECTRO-OPTICAL STREAKING IMAGE TUBE

BACKGROUND OF THE INVENTION

This invention relates to a method and apparatus for analyzing a streak image formed on an electro-optical streaking image tube, and more particularly to a method and apparatus for converting an ultrafast light pulse into a streak image and observing a change in the light pulse intensity with the passage of time.

In laser optics, spectroscopy and other fields where light pulses on the order of several picoseconds or under are analyzed and measured, such ultrafast light pulses are picked up by an image tube streak camera, then their intensity profiles are measured from the streak images produced by the camera. FIG. 1 illustrates a streak camera, in which an incident light pulse L is divided by a beam splitter 1 into two light beams. A beam that advances straight on is narrowed through a horizontal slit 2 (extending perpendicular to the paper).

The image of the slit 1 is projected through a focusing lens 3 on a photocathode 5 of a streak tube 4, and the photocathode 5 emits electrons proportional to the amount of incident light. The electrons are accelerated by an accelerating electrode 6.

Meanwhile, the other beam that is bent perpendicularly by the beam splitter 1 reaches and triggers a ramp generator 8 by way of a mirror 7. The ramp generator 8 generates a ramp voltage synchronous with the straight-advancing light beam. The ramp voltage is applied through a deflector electrode 9 to deflect the electrons emitted from the photocathode 5 in a direction perpendicular to the longitudinal axis of the slit 2. The deflected electrons reach a fluorescent screen 10 and converted to a streak image.

FIG. 2 shows an streak image S on the fluorescent screen 10 viewed in the direction of arrow A in FIG. 1, in which axis T represents time of incidence, axis X longitudinal position of the slit, and brightness intensity of incident light. The streak image S appears only for a very short time that corresponds to the duration of aftergrow on the fluorescent screen immediately after the arrival of the light pulse.

Conventionally, analysis of the streak image has been accomplished by use of an ordinary TV camera having such a camera tube as vidicon. This TV camera picks up the fluorescent screen of the streaking tube along the vertical T-axis and horizontal X-axis by the standard 1-frame, 2-field scanning method. Resulting video signals are directly displayed on a TV monitor for observation and, at the same time, integrated, by scanning line, into light intensity at each time point so as to represent a waveform of the incident pulsed light. Video signals are also integrated only for a limited period of time based on the synchronizing signal in order to obtain a waveform of an incident pulsed light that has passed a specific portion of the slit.

Generally, vertical resolution of the television picture is defined by the number of scanning lines in one frame. In interlaced scanning, the scanning lines of the first and second fields overlap, so that that portion of the storage signals to be read out in the second field which overlaps with the scanning of the first field is erased. Therefore, resolution is defined by the number of scanning lines in one field, too. This drawback is pronounced when picking up such an instantaneous image as streak image.

Progressive scanning eliminates this drawback because no signals are read out from the overlapped portion. Consequently, progressive scanning is substantially equivalent to scanning the unoverlapped portion with a fine beam. Accordingly, vertical resolution can be improved by increasing the number of scanning lines and employing the progressive scanning method. But application of progressive scanning not only to the pickup tube but also to the monitor and video recorder forbids the use of readily available or existing standard-scanning-type equipment.

SUMMARY OF THE INVENTION

This invention is intended for solving the aforementioned problems with the measurement of ultrafast light pulses using an electro-optical streaking image tube.

An object of this invention is to provide a method and apparatus permitting the use of a standard-scanning-type monitor and video recorder for analyzing with high resolution a streak image of light pulse formed on an electro-optical streaking image tube.

Another object of this invention is to provide a streak image analyzing apparatus that produces such signals as for displaying a high-resolution streak image together with a light pulse waveform on a standard-scanning-type monitor, or can be recorded in a video recorder as video signals for such combined display.

Yet another object of this invention is to provide a streak image analyzing apparatus that analyzes only the desired portion of a streak image.

According to this invention, a streak image is picked up by a progressive-scanning-type camera tube whose number of scanning lines is several times greater than that of the standard-scanning type, stored in a picture memory unit, read out from the picture memory unit by a 2n:1 interlaced scanning, assuming that the ratio of the number of scanning lines between the progressive and standard methods is n, made into 2n-field video signals, and reproduced as a standard-scanning-type television picture of n frames, combining two consecutive fields. The video signals obtained by the 2n:1 interlaced scanning are integrated by scanning line. The resulting data is stored at an address corresponding to the order of the scanning line of the picture memory unit in a second memory. The stored data are read out in the order of address to draw on a pen recorder a pulse light waveform obtained from an analysis of the high-resolution streak image or made digital display.

The streak image analyzing apparatus of this invention reads out the data from the second memory by a 2:1 interlaced scanning, and converts the data into time modulation pulses. By combining the pulses occurring after said time with the video signals read out from the picture memory unit, a waveform and streak image of pulsed light together are reproduced on a television monitor and recorded in a video recorder, both of the standard scanning type.

The streak image analyzing apparatus of this invention obtains a waveform of pulsed light that has passed a specific portion of a slit, integrating, by scanning line, the video signals that passes through a gate circuit within a given time range which is delayed by a given time from a horizontal synchronizing signal.

BRIEF DESCRIPTION OF THE DRAWINGS

FIG. 1 diagramatically illustrates a streak image camera.

FIG. 2 shows a fluorescent screen of a streak image tube.

FIG. 3 shows a streak image analyzing apparatus embodying the principle of this invention.

FIG. 4 shows a scanning method for reading out from a picture memory unit in FIG. 3.

FIG. 5 shows an embodiment of an integrating unit in FIG. 3.

FIG. 6 shows an arrangement of a second memory, a memory replacing a decoder, and a decoder in FIG. 3.

DETAILED DESCRIPTION OF THE PREFERRED EMBODIMENTS

FIG. 3 shows an arrangement of a streak image analyzing apparatus embodying the principle of this invention. Reference numeral 4 designates a streak image tube, and 10 a fluorescent screen thereof. Reference numeral 14 denotes a television camera disposed so as to pick up the fluorescent screen 10 of the streak image tube 4. Item 15 is a picture memory unit of the known type which stores video signals a emitted from the television camera 14 as two-dimentional data corresponding to the optical streak image and can read out the video signals by scanning line. An example of this memory unit is a storage tube that records an electron image on an insulated mesh, using modulated scanning beams, synchronously with the scanning of the television camera 14, then reads out the stored image by scanning the mesh with nonmodulated beams. Another example of the memory unit is a semiconductor memory whose storage positions, having a capacity of k bits to represent the gray scale of each picture element, are arranged in a matrix of m columns by l rows, corresponding to the number m of scanning lines and the number l of picture elements contained in each scanning line, so that it can store and read out the digital video signal by addressing the column and row. When the column is specified, this semiconductor memory reads out the stored data in each row of the specified column in the order in which they were stored. This memory calls for converting video signals of each picture element into digital signals of k bits. Following instructions from a control circuit 72, video signals are read out from the picture memory unit 15. The control circuit 72 sends forth an instruction signal k to read out the stored video signals from the picture memory unit 15 immediately or some time after detecting the completion of the storing of the video signals in the picture memory unit 15 or receiving manual instructions. The same instruction signal k is sent to an integrating unit 16 and second memory 17, too, to start integration and storing synchronously with the operation of the picture memory unit 15. When the video signals a have been read out, the picture memory unit 15 sends a completion signal p to the control circuit 72. Reference numeral 16 designates an integrating unit that integrates the video signals b read out from the picture memory unit 15 by scanning line. The integrating unit 16 is composed as shown in FIG. 5 as required. Item 62 is a time delay circuit, 63 a gate circuit, and 64 an integrating circuit. The video signals b are passed through the gate circuit 63 that is opened and closed by a pulse h emitted by the time delay circuit 62 that delays a horizontal synchronizing signal g inputted from a synchronizing signal generator 21 for a desired amount of time and converts said signal g into a pulse having a desired pulse width, then integrated by the integrating circuit 64. This permits integrating only such component of the pulsed light L that has passed the desired portion of a slit 2. Reference numeral 17 denotes a second memory that has as many addresses as are enough, at least, for storing and reading out analytical data the number of which is equal to that of scanning lines of the television camera 14. Read-out of the stored integrated data from the second memory 17 is controlled by a control circuit 71 connected thereto. On detecting the completion of the storing of the integrated data, the control circuit 71 sends a read-out signal to the second memory 17. Then the second memory 17 reads out the integrated data stroed by the 2:1 interlaced scanning. Reference numeral 18 designates a decoder circuit for indicating the value of data stored at each address of the second memory 17 as the position of luminous point on a scanning line. More particularly, this circuit is a volage-time conversion circuit or a digital signal-time conversion circuit. Item 19 is a mixer circuit that combines the video signals b from the picture memory unit 15 and data signals e from the decoder 18. Item 20 is a television monitor of the standard scanning type for displaying video signals f produced by the mixer circuit 20.

In the following paragraphs, the terms "scanning line" and "scanning" are used in their original senses with respect to the description of the television camera 14, monitor 20 and scanning method. For convenience of description, in addition, a group of memory locations in the picture memory unit 15 that corresponds to a single scanning line is called a scanning line, and the storing in and read-out from said group of memory locations in the picture memory unit 15 is called scanning, too.

The following describes the operation of the apparatus composed as described above. The television camera 14 is turned on before the pulsed light L to be observed reaches the electro-optical streaking image tube 4. When the pulsed light L does not reach, the fluorescent screen 10 of the streaking image tube 4 is substantially drak, so that the luminance of the video signal emitted from the television camera 14 is zero. When the pulsed light L reaches, a streak image S appears on the fluorescent screen 10, which is then picked up by the television camera 14 and stored therein until it is read out by scanning. Where the television camera uses a vidicon, the streak image S is stored in a target as a charge image which is erased on being read out by scanning with electron beams. Because of the afterimage phenomenon, however, the charge image is not erased by one scanning, and, therefore, read out over several frames. The television camera 14 performs progressive scanning as well as horizontal scanning perpendicular to axis T in FIG. 2 or the time axis of the streak image using scanning lines the number m of which is expressed as j×n, where j being the number of scanning lines used by a television of the standard scanning type and n an integer. If j=512, a multiple of 2 which is close to the number of scanning lines for commercial televisions, and n=4, m=2048. When several frames have been scanned, the streak image disappears to reduce the luminance of the video signal a from the television camera 4 back to zero. Accordingly, the video signals a are sent forth to the picture memory unit 15 over several frames, where it they are accumulated and stored two-dimensionally or as a mapping of the streak image. Where the picture memory unit 15 is a storage tube as mentioned previously, the video signals a emitted from the television camera 14 over several frames are added together by repeatedly accumulating charge images resembling the streak image, so that the mapping of the streak image is memorized as one frame. Where the picture memory unit 15 is a semiconductor memory, the video signals a are added together over several frames as bit signals indicating the gradation of a picture element corresponding to each memory location, whereby the mapping of the streak image is memorized as one frame. Stored by combining several frames into one as described above, the streak image is reproduced on the monitor 20 with high contrast and signal-to-noise ratio. After storing the video signals a of the streak image, the picture memory unit 15 reads out the video signals b by a 2n:1 interlaced scanning since the ratio of the number m of scanning lines of the television camera 14 and the number j of scanning lines of the standard scanning type is n. Assuming that n=4 as mentioned before, the following names the scanning lines in the order of progressive scanning as shown in FIG. 4.

1st field 1, 9 ... $(8i+1)$ ... $(m-7)$
2nd field 5,13 ... $(8i+5)$ ... $(m-3)$
3rd field 2,10 ... $(8i+2)$ ... $(m-6)$
4th field 6,14 ... $(8i+6)$ ... $(m-2)$
5th field 3,11 ... $(8i+3)$ ... $(m-5)$
6th field 7,15 ... $(8i+7)$ ... $(m-1)$
7th field 4,12 ... $(8i+4)$ ... $(m-4)$
8th field 8,16 ... $(8i+8)$ ... m The video signals b are read out in the above order. In the above, m=total number of scanning lines, and i=integer from 0 to m/8−1. Where the picture memory unit is a storage tube, this read-out can be achieved by simply controlling the deflection voltage of read-out electron beam. With a semiconductor meory, by designating the row following the above order.

The video signals b thus read out are displayed on the monitor 20 by way of the mixer circuit 19 which combines two fields into one frame. The first and second fields make up the first frame, the third and fourth fields form the second frame, and the same process is repeated for the third and fourth frames. After the fourth frame, the cycle returns to the first frame. Since the video signals b read out from the picture memory unit 15 are adapted for the 2:1 interlaced scanning with 512 scanning lines, the monitor 20 can be of the popular standard scanning type. Following these procedures, the streak image is displayed on the monitor 20. When the picture memory unit 15 stores digital signals, they are converted to analog.

The video signals b from the picture memory unit 15 are also integrated by the integrating unit 16 by scanning line. This integration may be applied to such component of the pulsed light L that has passed the desired portion of the slit 2 by integrating the video signals b in the integrating circuit 64 by way of the gate circuit 63 that is opened and closed by the pulse h within the horizontal scanning period which is produced by delaying for a desired amount of time and converting to provide a desired pulse width, using the time delay circuit 62, the horizontal synchronizing signal g inputted from the synchronizing signal generator 21. This limited integration is effective for determining the waveform of a specific wavelength portion of the pulsed light L dispersed by a prism or diffraction grating in the longitudinal direction of the slit 2. When displayed on the monitor 20, the gate circuit open-close pulse forms a belt of uniform width running perpendicular to the scanning line. This line-by-line integration improves the signal-to-noise ratio of the analytical data or the strength of the pulsed light measured. When the gate circuit 63 is used, the greater gate width results in the greater signal-to-noise ratio improvement. The integrated values c obtained for individual scanning lines are stored at corresponding addresses in the second memory 17. Namely, the second memory 17 stores the integrated values c in the address order of 1, 9 ... $(8i+1)$ ... $(m-7)$, 5, 13 ... $(8i+5)$ ... $(m-3)$, 2, 10 ... $(8i+2)$ ... $(m-6)$, 6, 14 ... $(8i+6)$ ... $(m-2)$, 3, 11 ... $(8i+3)$ ... $(m-5)$, 7, 15 ... $(8i+7)$ ... $(m-1)$, 4, 12 ... $(8i+4)$ ... $(m-4)$, 8, 16 ... $(8i+8)$ ... m. Thus the second memory 17 stores the integrals of the video signals for the individual scanning lines in the order of the scanning lines. Memory signals d are read out by the 2:1 interlaced scanning on the horizontal scanning cycle from consecutive addresses whose number is j that is equal to the number of scanning lines employed by the standard scanning method. The read-out signals are converted into time signals in the decoder 18, which are combined in the mixer circuit 19 with the video signals b from the picture memory unit 15 for display on the monitor 20. For example, pulse is generated, delayed behind the horizontal synchronizing signal g by the time proportional to the output signal from the second memory 17, then combined with the video signal b. As a consequence, both the streak image and the waveform of the pulsed light L are displayed on the monitor 20. It is also possible to adjust the reference point of the displayed waveform amplitude by increasing the delay time or carry out the said time conversion after converting the output signal to the logarithm or exponent. The video signal b from the picture memory unit 15 enters the monitor 20 immediately or with a slight delay. Meanwhile, the integral for each scanning line is delayed more by computing and storing operations. Despite this time lag, the video signal and integral can be combined because they are emitted repeatedly. Address can be designated in reading out from the second memory 17. Therefore, the vertical time coordinate of the pulsed light waveform can be brought into agreement with that of the streak image by reading out in the same order as in reading out the scanning lines from the picture memory unit 15. Instead of reading out all addresses, those addresses corresponding to arbitrary two fields, selected from 2n fields are scanned sequentially in both the picture memory unit and the second memory. In this case a rough streak image and its intensity profile are observed on the TV monitor. Furthermore, addresses corresponding to a series of scanning lines, consisting of j lines, in both the picture memory unit and the second memory are scanned synchronously, so that a partial streak image and its intensity profile with high time resolution are observed on the TV monitor. It is also possible to obtain the signal e from the recorder 18 in the order of the address of the second memory 18 and to be input in the recorder 23 to record the wave form of the light pulse L with high time resolution.

The addresses in the second memory 17 may be divided into four groups; addresses 1 to m/4 as the first group, addresses m/4+1 to m/2 as the second group, addresses m/2+1 to 3m/4 as the third group, and addresses 3m/4+1 to m as the fourth group. These groups are connected to individual decoders 81, 82, 83 and 84. A different value is added to the integral d of the video signal in each group. The integrals d of all groups are then simultaneously converted into pulse delay times by the 2:1 interlaced scanning for each horizontal scanning period, following the order of their address. The resulting pulse is combined with the video signal b in the mixer circuit 19. Consequently, an entirety of the pulsed light waveform is displayed with high resolution, in quartered sections, on the same screen on which the streak image appears.

The video signals combined in the mixer circuit 19 can be not only displayed on the monitor but also recorded in the video recorder, both of the standard scanning type.

The memory signals in the second memory 17 are fed through the mixer circuit 19 to the monitor 20 for display. Further, the memory signals may be read out in an order and on a cycle, such as one based on the blanking period for each field, completely independent of those for display on the monitor 20. A pen recorder plots the output signal of the second memory 17 along the x-axis and the output signal read-out time along the y-axis, thus forming a waveform of the pulsed light with high time resoltuion.

The pen recorder may be replaced by a printer that converts the output signals into digital display.

This invention is not necessarily limited to the above-described embodiment in which the number m of scanning lines of the television camera 14 is an integral multiple of the number j of scanning lines for the standard scanning method. For example, this invention is applicable to a case in which 2n is an odd number. In such a case, the above-described procedure is applied to the 2n−1 or 2n+1 fields, leaving the remaining one field undisplayed or displaying the remaining one field two times on the monitor.

What is claimed is:

1. A method of analyzing a streak image of light pulse formed on an electro-optical streaking image tube comprising the steps of:
   picking up the streak image formed on a fluorescent screen of the electro-optical streaking image tube by a progressive scanning method that employs as many scanning lines as are n-times greater in number than in the standard scanning method, using a television camera;
   storing the picked up video signals in a picture memory unit by the progressive scanning method so that the streak image is kept two-dimensionally;
   reading out the stored video signals by the 2n:1 interlaced scanning for integration by scanning line;
   storing the integrals at addresses corresponding to the order to the scanning lines; and
   inputting the integrals read out in the order of address, on completion of the storing of the integrals for all scanning lines, in means for displaying and/or recording which displays and/or records the waveform of the light pulse.

2. A streak image analyzing method according to claim 1, wherein the stored integrals are read out by the 2:1 interlaced scanning for conversion into time modulation pulses based on a horizontal synchronizing signal, the time modulation pulses being progressively combined with the video signals at a rate of one for each scanning line.

3. A streak image analyzing method according to claim 1, wherein the integration of the video signals is performed only for a specified period of time based on the horizontal synchronizing signal for each scanning line.

4. An apparatus for analyzing a streak image of light pulse formed on an electro-optical streaking image tube comprising:
   a television camera picking up the streak image formed on a fluorescent screen of the electro-optical streaking image tube by a progressive scanning method that employs as many scanning lines as are n-times greater in number than in the standard scanning method;
   a first memory storing the video signals from the television camera by the progressive scanning method and reading out the stored video signals, after a suitable time on completion of the storing over all scanning lines, by the 2n:1 interlaced scanning;
   means for integrating the read-out video signals by scanning line;
   a second memory storing the integrals at addresses arranged in the order of the scanning lines;
   means for controlling the second memory so as to read out the stored integrals in the order of address on completion of the storing of the integrals for all scanning lines; and
   means for displaying and/or recording a waveform of light pulse formed by the signals from the second memory.

5. A streak image analyzing apparatus according to claim 4, which comprises a circuit mixing the video signals from the first memory and signals from the second memory, the mixing circuit sending signals to the display means, so that the display means displays the streak image and pulse waveform thereof simultaneously.

6. A steak image analyzing apparatus according to claim 4, wherein the integrating means comprises a circuit delaying the horizontal synchronizing signal for a desired length of time, a gate circuit opened and closed by a signal from the time delay circuit, and a circuit integrating the video signals sent from the first memory through the gate circuit, so that the signal of the light pulse passing through a desired portion of the streak tube slit is integrated.

* * * * *